US007930682B2

(12) United States Patent
Murthy (10) Patent No.: US 7,930,682 B2
(45) Date of Patent: Apr. 19, 2011

(54) PATH COVERAGE CRITERION IN SPECIFICATION-BASED TESTING BASED ON AN EXTENDED CONTEXT-FREE GRAMMAR-BASED TEST SPECIFICATION MODEL AND A NEW TEST GENERATION ALGORITHM

(75) Inventor: Prakriya Venkata Ramana Murthy, Bangalore (IN)

(73) Assignee: Siemens Information Systems Ltd., Mumbai (IN)

( * ) Notice: Subject to any disclaimer, the term of this patent is extended or adjusted under 35 U.S.C. 154(b) by 1402 days.

(21) Appl. No.: 11/388,074

(22) Filed: Mar. 23, 2006

(65) Prior Publication Data

US 2006/0214948 A1 Sep. 28, 2006

Related U.S. Application Data

(60) Provisional application No. 60/665,128, filed on Mar. 25, 2005.

(51) Int. Cl.
*G06F 9/44* (2006.01)
(52) U.S. Cl. ........................................ 717/124; 717/104
(58) Field of Classification Search .................. 717/124
See application file for complete search history.

(56) References Cited

U.S. PATENT DOCUMENTS

| | | | | |
|---|---|---|---|---|
| 5,659,554 | A * | 8/1997 | Okayasu | 714/738 |
| 5,918,037 | A * | 6/1999 | Tremblay et al. | 716/2 |
| 6,189,116 | B1 * | 2/2001 | Mongan et al. | 714/38 |
| 6,324,496 | B1 * | 11/2001 | Alur et al. | 703/17 |
| 6,505,342 | B1 * | 1/2003 | Hartmann et al. | 717/104 |
| 6,804,634 | B1 * | 10/2004 | Holzmann et al. | 703/2 |
| 6,853,963 | B1 * | 2/2005 | Apfelbaum et al. | 703/2 |
| 7,055,065 | B2 * | 5/2006 | Farchi et al. | 714/38 |

OTHER PUBLICATIONS

Test Development Environment Language Reference Manual Siemens Information Systems Year of Publication: 1998.*
UML-Based Integration Testing Jean Hartmann, Claudio Imoberdorf, Michael Meisinger International Symposium on Software Testing and Analysis Year of Publication: 2000.*
Automatic Generation of Test Scripts from Formal Test Specifications Marc J. Balcer, William M. Hasling, and Thomas J. Ostrand ACM SIGSOFT Software Engineering Notes vol. 14 , Issue 8, pp. 210-218, Year of Publication: 1989.*
Using Attributed Grammars to Test Designs and Implementations A.G. Duncan, J.S. Hutchison Proceedings of the 5th international conference on Software engineering pp. 170-178 Year of Publication: 1981.*
A Visual Test Development Environment for GUI Systems Thomas Ostrand, Aaron Anodide, Herbert Foster, and Tarak Goradia ACM SIGSOFT Software Engineering Notes vol. 23 , Issue 2, pp. 82-92 Year of Publication: 1998.*

(Continued)

*Primary Examiner* — Emerson C Puente
*Assistant Examiner* — Paul Mills
(74) *Attorney, Agent, or Firm* — Donald B. Paschburg; F. Chau & Associates, LLC (57) ABSTRACT

A system and method for generating test frames in specification-based testing by using a path-coverage criterion is provided. The method includes receiving a test design as an input, and constructing a context-free grammar graph, based on the test design. The method further includes analyzing the context-free grammar graph to generate a first set of paths, and emitting a set of test frames as an output, based on the first set of paths.

20 Claims, 8 Drawing Sheets

OTHER PUBLICATIONS

Efficient Regression Testing of Multi-Panel Systems Williams, C. Paradkar, A. 10th International Symposium on Software Reliability Engineering pp. 158-165 Year of Publciation: 1999.*

Using Production Grammars in Software Testing Emin Gun Sirer and Brian N. Bershad Proceedings of the 2nd conference on Domain-specific languages pp. 1-13 Year of Publication: 1999.*

Test Ready UML Statechart Models PVR Murthy, PC Anitha, M Mahesh, and Rajesh Subramanyan SCESM'06, May 27, 2006, Shanghai, China.*

The Dynamic Domain Reduction Procedure for Test Data Generation A. Jefferson Offutt Zhenyi Jin Jie Pan Software Practice and Experience vol. 29 Issue 2 Feb. 1999.*

User-Based Testing of GUI Sequences and Their Interactions Lee White, Husain Almezen and Nasser Alzeidi Software Reliability Engineering ISSRE 2001 Nov. 2001.*

Generating Test Data with Enhanced Context-Free Grammars Peter M. Maurer IEEE Software vol. 7, Issue 4 Jul. 1990.*

On-the-Fly Generation of K-Path Tests for C Functions: towards the Automation of Grey-Box Testing Nicky Williams, Bruno Marre and Patricia Mouy Year of Publication: 2004.*

Siemens Test Development Environment—The Tool for Cost-Effective, Coverage-Directed Test Generation—Language Reference manual.

The Category—Partition Method for Specifying and Generating Functional Tests.

* cited by examiner

PATH COVERAGE CRITERION IN SPECIFICATION-BASED TESTING BASED ON AN EXTENDED CONTEXT-FREE GRAMMAR-BASED TEST SPECIFICATION MODEL AND A NEW TEST GENERATION ALGORITHM

CROSS-REFERENCE TO RELATED APPLICATIONS

This application claims the benefit of U.S. Provisional Application No. 60/665,128, filed Mar. 25, 2005, which is incorporated herein by reference.

FIELD OF THE INVENTION

The present invention relates generally to the field of software testing. More particularly, the present invention relates to generating test frames in specification-based testing.

BACKGROUND OF THE INVENTION

Software testing is a process that is used to verify the correctness, completeness, and quality of computer software. It is also used to identify the security features of computer software. In software testing, two broad approaches are used—white-box testing and black-box testing.

In white-box testing, the test developer has knowledge of the internal structure of the source code of the target software to be tested. The test developer has access to the source code of the target software and can insert the code that can link to libraries, which implement the majority of system services. There exist coverage criteria in white-box testing. Examples of coverage criteria include a statement-coverage criterion, a branch-coverage criterion, and a path-coverage criterion. The use of the statement-coverage criterion determines whether each executable statement in the target software code is covered. The branch-coverage criterion is used to identify and validate all the branches in the target software code and ensure that no branching results in the target software behaving in an undesirable manner. The path coverage criterion reports whether each of the possible paths in each function of the target software code has been tested.

In black-box testing, also referred to as specification-based testing or behavioral testing, the test developer does not have access to the source code of the target software to be tested. The test developer is able to access the target software through the same interface that a user is able to access. More specifically, in the case of black-box testing, the test developer knows only about the inputs and the expected outcome corresponding to these inputs. The test developer does not know how the target software arrives at these expected outputs. In black-box testing, coverage criteria such as statement coverage, branch coverage, and path coverage are not widely used.

There are several methods that are widely used in black-box testing. One of these methods involves the equivalence class-partitioning method. In this method, the test developer partitions the input domain of arguments pertaining to the function being tested into equivalence classes. Consequently, if target software is tested for one member of an equivalence class, it is equivalent to it being tested for all the members of the equivalence class. Another method involves boundary value analysis, which involves the creation of test cases around the corners of values in loop conditions, and validating these test cases. For example, in a system or a program that accepts as input a number between one and 10, boundary value analysis would indicate that test cases should be created for the lower and upper bounds of the input domain (1, 10), as well as values just outside these bounds (0, 11), to ensure proper functionality.

Yet another method involves the use of the Category Partition Method (CPM), based on an extended context-free grammar (ECFG) model. The CPM is implemented by means of a Test Specification Language (TSL). A test generator accepts test designs in a TSL format as an input and generates executable test programs, which are also referred to as test frames. A category in the CPM can hold the same value for all the references of the category. A partition can hold different values for different references of the partition. The choices associated with the categories and partitions represent equivalence classes. The method using CPM involves both choice and group coverage. If there are three categories, each consisting of three choices in a program, choice coverage may imply nine test frames, ensuring that all the six choices are used in the emitted test frames. In group coverage, each and every choice of a first category is combined with each and every choice of a second category, thereby producing 27 test frames. The method using CPM involves random selection of choices for associated categories, and partitions and evaluating pre-conditions that are associated with these choices. Typically, a precondition is a Boolean expression that is made up of variables introduced in the test design and/or Boolean expressions specifying the selection status of the choices associated with non-terminals.

The methods mentioned above have one or more of the following limitations. First, if a randomly selected choice does not satisfy associated pre-conditions for a particular category or a partition, back-tracking is required. This process introduces overheads, as choices for already validated categories, or the partitions may need to be validated again. Second, in the above-mentioned methods, especially in CPM after the test generator for the test design in TSL generates the executable test programs, it is not confirmed whether all the test scenarios have been covered. Third, these methods do not provide specific guidelines for choosing inputs and do not provide any framework for a test developer.

SUMMARY OF THE INVENTION

The present invention describes a method for generating test frames in specification-based testing. The method includes receiving a test design as an input. The test design can be represented as an extended context-free grammar (ECFG) and can be expressed in Test Specification Language (TSL). Thereafter, a context-free grammar graph is constructed based on the test design. The context-free grammar graph can include a plurality of paths. The context-free grammar graph is analyzed to generate a first set of paths from the plurality of paths that satisfy one or more pre-conditions. A set of test frames is also emitted as an output, based on the first set of paths.

Consequently, the present invention provides a method that accepts an ECFG model-based test design as an input, to generate all possible test frames. The present invention advantageously reduces frequent back-tracking with repeated random number generation overheads, while systematically traversing a context-free grammar graph of a test design.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF THE EMBODIMENTS

Before describing in detail the embodiments in accordance with the present invention, it should be observed that the embodiments reside primarily in the method and system employed for generating test frames in specification-based testing. Accordingly, the system components and method steps have been represented to show only those specific details that are pertinent to understanding the embodiments of the present invention, and not with details that will be apparent to those of ordinary skill in the art.

The present invention describes a method for generating test frames in specification-based testing by using a path-coverage criterion. The method includes receiving a test design as an input. The test design can be represented as an extended context-free grammar (ECFG) and can be expressed in Test Specification Language (TSL). The method also includes constructing a context-free grammar graph, based on the test design. This context-free grammar graph can include a plurality of paths. The method also includes analyzing the context-free grammar graph to generate a first set of paths from the plurality of paths that satisfy one or more pre-conditions. The one or more pre-conditions can be associated with the choices of the context-free grammar graph. The method also includes emitting a set of test frames as an output. The set of test frames can be a second set of paths, obtained from the first set of paths that satisfy a frame constraint specified in the test design.

The present invention also describes a test generator for generating test frames in specification-based testing. The test generator includes a means for receiving a test design as an input. The test design can be represented as an ECFG and expressed in TSL. The test generator also includes a means for constructing a context-free grammar graph, based on the test design. The context-free grammar graph can include a plurality of paths. The test generator also includes a means for analyzing the context-free grammar graph to generate a first set of paths that satisfy one or more pre-conditions. Further, the test generator includes a means for emitting a set of test frames as an output. This set of test frames can be a second set of paths obtained from the first set of paths that satisfy a frame constraint specified in the test design. In an embodiment of the present invention, the test generator includes a memory and a processor. The test design is stored in the memory and is represented as an ECFG. The processor is operatively coupled to the memory. The processor is operable to construct a context-free grammar graph based on the test design. The processor is further operable to analyze the context-free grammar graph to generate a first set of paths from the plurality of paths that satisfy one or more pre-conditions. The processor can also emit a set of test frames as an output of the test generator.

The present invention also describes a computer program product for generating test frames in specification-based testing. The computer program product includes a computer readable medium that includes program instruction means for receiving a test design as an input. The test design is represented as an ECFG. The computer readable medium also includes program instruction means for constructing a context-free grammar graph, based on the test design. The context-free grammar graph includes a plurality of paths. The computer readable medium also includes program instruction means for analyzing the plurality of paths of the context-free grammar graph, to generate a first set of paths, such that one or more pre-conditions associated with the choices pertaining to the first set of paths are satisfied. The computer readable medium also includes program instruction means for emitting a set of test frames as an output. The set of test frames is a second set of paths from the first set of paths, such that the second set of paths satisfies a frame constraint specified in the test design.

Figure 1:
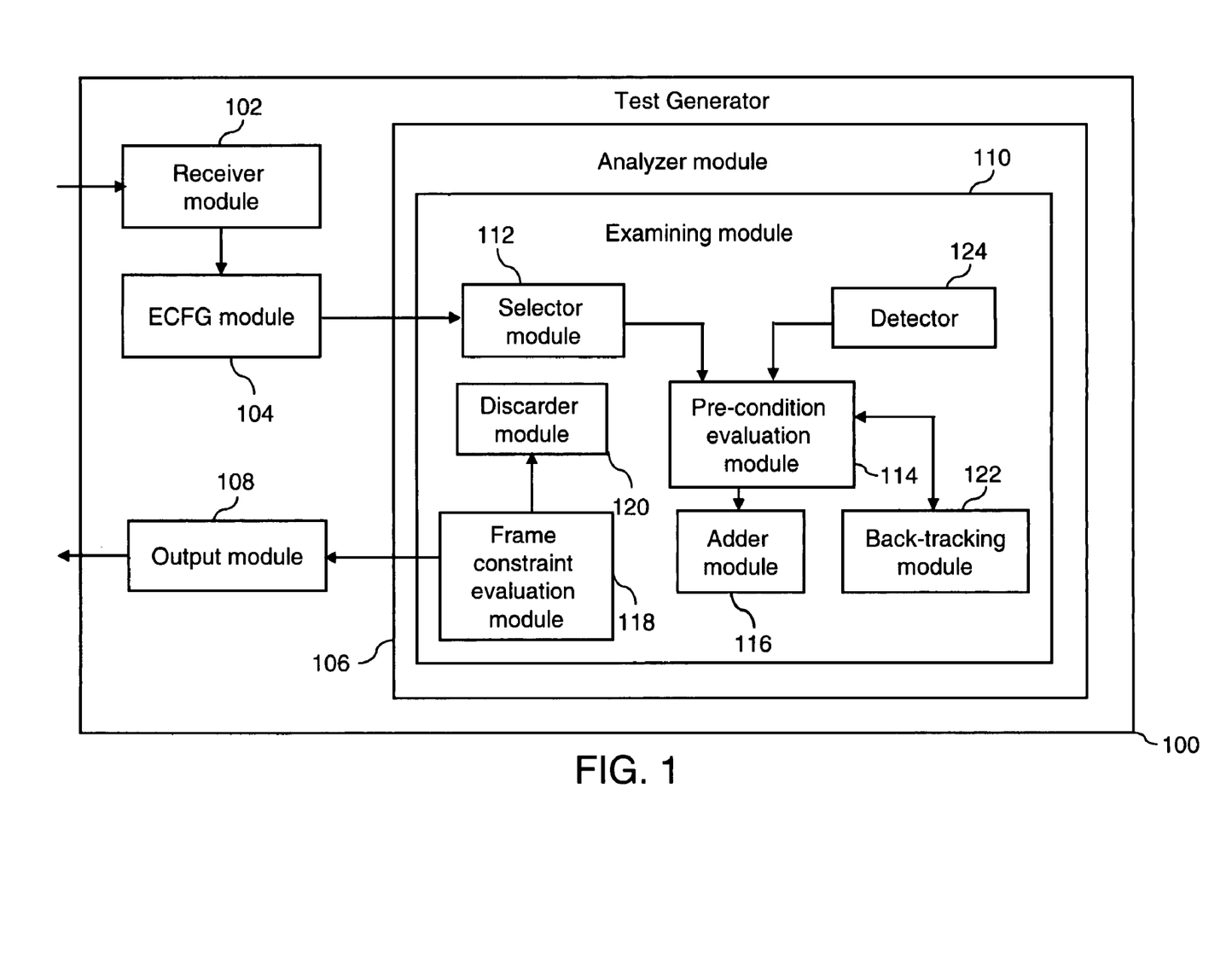
FIG. 1 illustrates an exemplary test generator where various embodiments of the present invention can be practiced.

FIG. 1 illustrates a test generator 100, in accordance with an embodiment of the present invention. The test generator 100 generates the test frames in specification-based testing for a test design provided as an input. This test design is represented as an ECFG and is represented in TSL. The test design provides different test scenarios, a test scenario being an instance of a test frame. The test generator 100 includes a means for receiving the test design as an input, hereinafter referred to as a receiver module 102; a means for constructing a context-free grammar graph, based on the test design, hereinafter referred to as an ECFG module 104; a means for analyzing the context-free grammar graph, hereinafter referred to as an analyzer module 106; and a means for emitting a set of test frames as an output, hereinafter referred to as an output module 108.

The receiver module 102 is configured to receive a test design as an input for the test generator 100. The test design can be represented as an ECFG and can be expressed in a TSL. The test generator 100 can view the test design in the form of an ECFG. The test generator 100 can also view the test frames generated in the form of sentences derivable from the ECFG. The receiver module 102 can be communicably coupled to the ECFG module 104. The ECFG module 104 is configured to construct a context-free grammar graph based on the test design. The context-free grammar graph is based on an ECFG model and includes a plurality of paths. Each path from the plurality of paths represents a test frame. Individual internal nodes of the context-free grammar graph are associated with non-terminals of the ECFG, while individual leaf nodes of the context-free grammar graph are associated with terminals of the ECFG. A terminal is an indivisible entity of an ECFG that represents a constant value and cannot be expressed in terms of other terminals or non-terminals. A non-terminal is an expandable entity of an ECFG that can be expressed in terms of other terminals or non-terminals of the ECFG. Typically, the path represents a production of a start non-terminal that ends with a terminal. A path from the plurality of paths can have choices and associated pre-conditions. Choices are edges joining the nodes of the context-free grammar graph. A choice can imply an alternative production of a non-terminal in the ECFG. A pre-condition can be associated with a choice. Typically, a precondition is a Boolean expression that is made up of variables introduced in the test design and/or Boolean expressions specifying the selection status of the choices associated with non-terminals. In an embodiment of the present invention, the Boolean expression is set during test generation. A choice is selected if a pre-condition associated with the choice is satisfied. The path is selected if all the pre-conditions associated with the choices that relate to the path are satisfied. Typically, the context-free grammar graph represents all the possible test scenarios of the test design. Presented below is an exemplary ECFG:

TestFrame-->Account Withdrawal
Account-->Current|Savings
Withdrawal-->Small-amounts; pre-condition (Account~Current)
-->Big-amounts; pre-condition (Account~Savings)

'Account' and 'Withdrawal' are categories or partitions pertaining to the ECFG. 'Current' and 'Savings' are the choices of the category or the partition 'Account'. A pre-condition (Account~Current) is associated with the choice 'Small-amounts' of non-terminal 'Withdrawal'. The choice 'Small-amounts' of the non-terminal 'Withdrawal' can be selected only if the pre-condition that the choice 'Savings' of the non-terminal 'Account' has been selected. Similarly, the choice 'Big-amounts' of the non-terminal 'Withdrawal' can be selected only if the pre-condition that the choice 'Current' of the non-terminal 'Account' has been selected. Based on the ECFG described above, the valid paths are 'Account-->Current, Withdrawal-->Small-amounts' and 'Account-->Savings, Withdrawal-->Big-amounts'. The Invalid paths are 'Account-->Current, Withdrawal-->Big-amounts' and 'Account-->Savings, Withdrawal-->Small-amounts'. The ECFG module 104 is communicably coupled to the analyzer module 106.

The analyzer module 106 is capable of analyzing the context-free grammar graph and generating a first set of paths from the plurality of paths that satisfy the pre-conditions associated with the choices of the context-free grammar graph. Typically, the analyzer module 106 filters out unwanted paths from the plurality of paths. Examples of unwanted paths include paths with invalid branching and/or invalid choices, and the like. The first set of paths represents a collection of paths from the plurality of paths that satisfy associated pre-conditions. The output module 108 is capable of emitting a set of test frames as an output of the test generator 100. The set of test frames is a second set of paths derived from the first set of paths that satisfies a frame constraint specified in the test design. The output module 108 is communicably coupled to the analyzer module 106. The analyzer module 106 includes a means for examining the plurality of paths of the context-free grammar graph, hereinafter referred to as an examining module 110. The examining module 110 is configured to examine each path from the plurality of paths, starting from a root node of the context-free grammar graph to a leaf node of the context-free grammar graph. The examining module 110 is configured to visit the nodes of the context-free grammar graph. The examining module 110 performs a traversal of the context-free grammar graph, starting from the root node, for example, the start non-terminal of the ECFG to the leaf node, for example, a terminal. During the traversal, the examining module 110 visits each node of the context-free grammar graph and verifies the pre-conditions associated with the choices out of the node of the context-free grammar graph. In an embodiment of the present invention, the examining module 110 performs a depth-first traversal of the context-free grammar graph.

The examining module 110 includes a means for selecting a choice out of a node of the context-free grammar graph, hereinafter referred to as a selector module 112; and a means for evaluating a pre-condition associated with the choice, hereinafter referred to as a pre-condition evaluation module 114. During the traversal of the context-free grammar graph, the selector module 112 is configured to initially select a choice out of a node of the context-free grammar graph, for example, a non-terminal of the ECFG. In an embodiment of the present invention, the selector module 112 is configured to initially select a choice out of a non-terminal, based on the depth-first traversal of the context-free grammar graph. The selector module 112 is communicably coupled to the pre-condition evaluation module 114. The pre-condition evaluation module 114 is configured to evaluate a pre-condition associated with a choice out of a non-terminal of the context-free grammar graph. The selector module 112 is also configured to finally select the choice when the pre-condition evaluation module 114 has evaluated the pre-condition associated with the choice.

The examining module 110 further includes a means for adding a path from the plurality of paths to a set of paths, hereinafter referred to as an adder module 116; and a means for evaluating a path for a frame constraint, hereinafter referred to as a frame-constraint evaluation module 118. The adder module 116 is configured to add a path from the plurality of paths to the first set of paths, when the path satisfies all the pre-conditions associated with the choice of the path. The adder module 116 is also configured to add a path from the first set of the paths to a second set of paths, when the path satisfies a frame constraint specified in the test design. The second set of paths represents a collection of paths from the first set of paths that satisfies the frame constraint. The frame constraint evaluation module 118 is capable of evaluating a path from the first set of paths for the frame constraint specified in the test design.

Further, the examining module 110 also includes a means for discarding a path, hereinafter referred to as a discarder module 120; a means for back-tracking to an ancestor node of the path, hereinafter referred to as a back-tracking module 122; and a means for detecting cycles in the context-free grammar graph, hereinafter referred to as a detector 124. The discarder module 120 is communicably coupled to the frame-constraint evaluation module 118 and is capable of deleting a path from the first set of paths when the path fails to satisfy the frame constraint specified in the test design. The back-tracking module 122 is communicably coupled to the pre-condition evaluation module 114. The back-tracking module 122 is capable of exploring alternative choices out of a node of the context-free grammar graph, when a pre-condition associated with a choice is not satisfied. These alternative choices refer to choices out of the node, other than the choice under consideration. The back-tracking module 122 is also configured to back-track to a previous node of a path, to explore an alternative choice out of the previous node, when all the choices out of the node fail to satisfy associated pre-conditions. In an embodiment of the present invention, the previous and the alternative choice out of the previous node are a part of an alternative path from the plurality of paths. The previous node can be an ancestor node of the node under consideration. In an embodiment of the present invention, the ancestor node is the root node of the context-free grammar graph. The detector 124 is configured to detect cycles in the context-free grammar graph. To detect these cycles, the detector 124 can maintain a list of nodes of the context-free grammar graph, which are visited by the examining module 110. The detector 124 is also configured to repeatedly expand the cycles in a generic path, one or more times, to obtain specific cycle-free paths. In an embodiment of the present invention, a depth-first traversal of the context-free grammar graph is employed to construct different possible paths in the context-free grammar graph.

In an embodiment of the present invention, the test generator includes a memory and a processor. The test design is stored in the memory and is represented as an ECFG. The processor is operatively coupled to the memory. The processor is operable to construct a context-free grammar graph based on the test design. The context-free grammar graph can have a plurality of paths. The processor is further operable to analyze the context-free grammar graph to generate a first set of paths from the plurality of paths that satisfy one or more pre-conditions. Typically, the one or more pre-conditions are associated with choices of the context-free grammar graph. The processor can also emit a set of test frames as an output of the test generator. Typically, the set of test frames is a second set of paths obtained from the first set of paths that satisfy a frame constraint specified in the test design. The test generator also includes an input interface. The input interface is operatively coupled to the memory and the processor. The input interface provides the test design as an input for the test generator. Examples of the input interface include a keyboard, a touch screen keypad, and the like.

Figure 2:
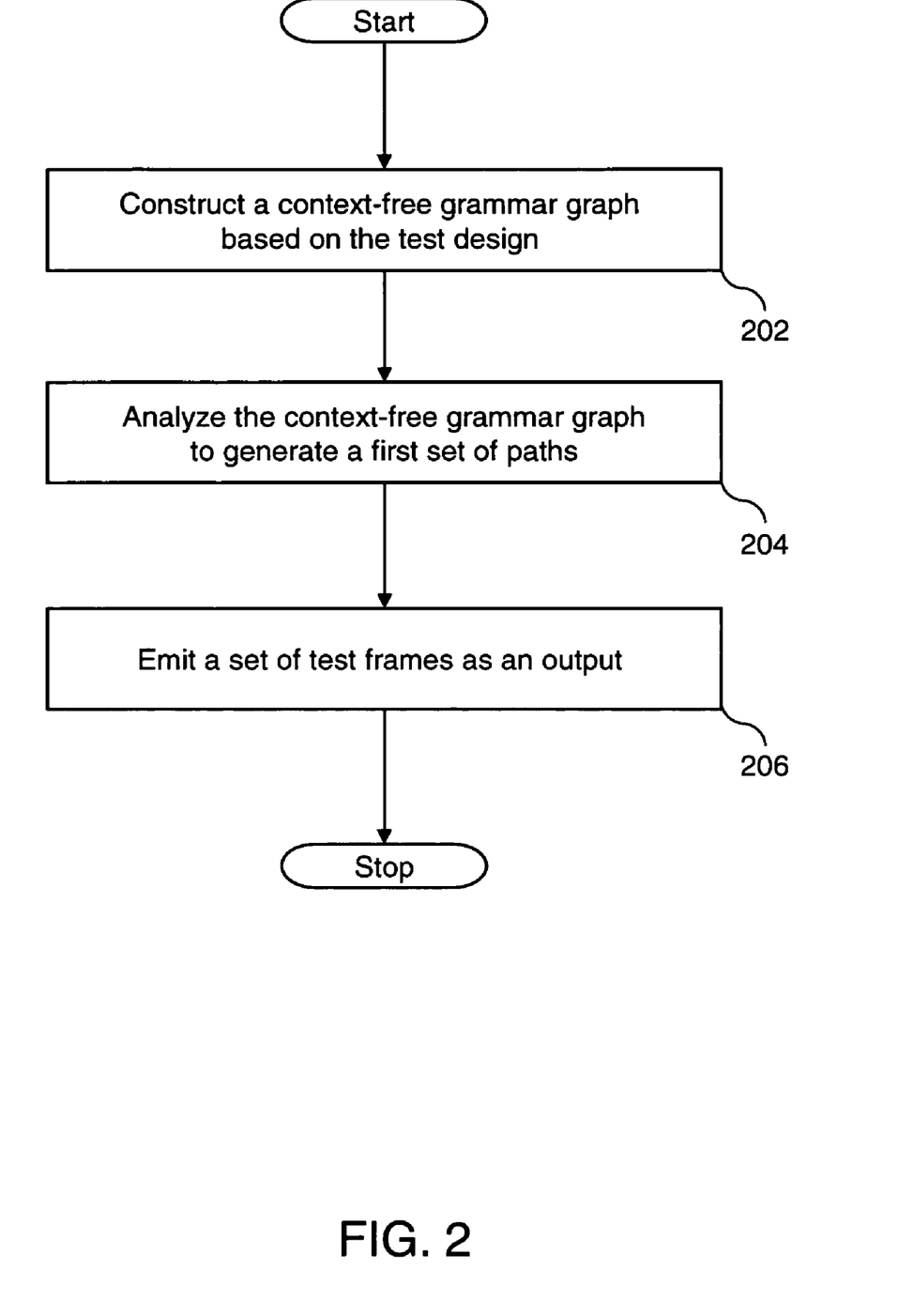
FIG. 2 is a flow diagram illustrating a method for generating test frames in specification-based testing based on extended context-free models, in accordance with an embodiment of the present invention.

FIG. 2 is a flow diagram illustrating a method for generating test frames in specification-based testing based on ECFG models, in accordance with another embodiment of the present invention. To describe the method, reference will be made to FIG. 1, although it is understood that the method can be implemented with reference to any other suitable embodiment of the present invention. Further, the method can contain a greater or fewer numbers of steps than shown in FIG. 2.

At step 202, a context-free grammar graph is constructed, based on the test design. The context-free grammar graph is constructed by the test generator 100. The test design is provided as an input to the test generator 100. The test design is based on ECFG models and can be represented in TSL. The context-free grammar graph includes a plurality of paths that represent all possible test scenarios involved in the test design. At step 204, the context-free grammar graph is analyzed by the test generator 100 to generate a first set of paths. The first set of paths represents a collection of paths from the plurality of paths that satisfy pre-conditions associated with the choices in the context-free grammar graph. These choices are associated with the plurality of paths in the context-free grammar graph. Typically, unwanted paths are filtered out from the plurality of paths. Examples of unwanted paths include paths with invalid branching and/or invalid choices, and the like. At step 206, a set of test frames is emitted as an output of the test generator 100. The set of test frames represent a second set of paths from the first set of paths that satisfy a frame constraint associated with the test design. Typically, the frame constraint is specified in the test design.

Figure 3:
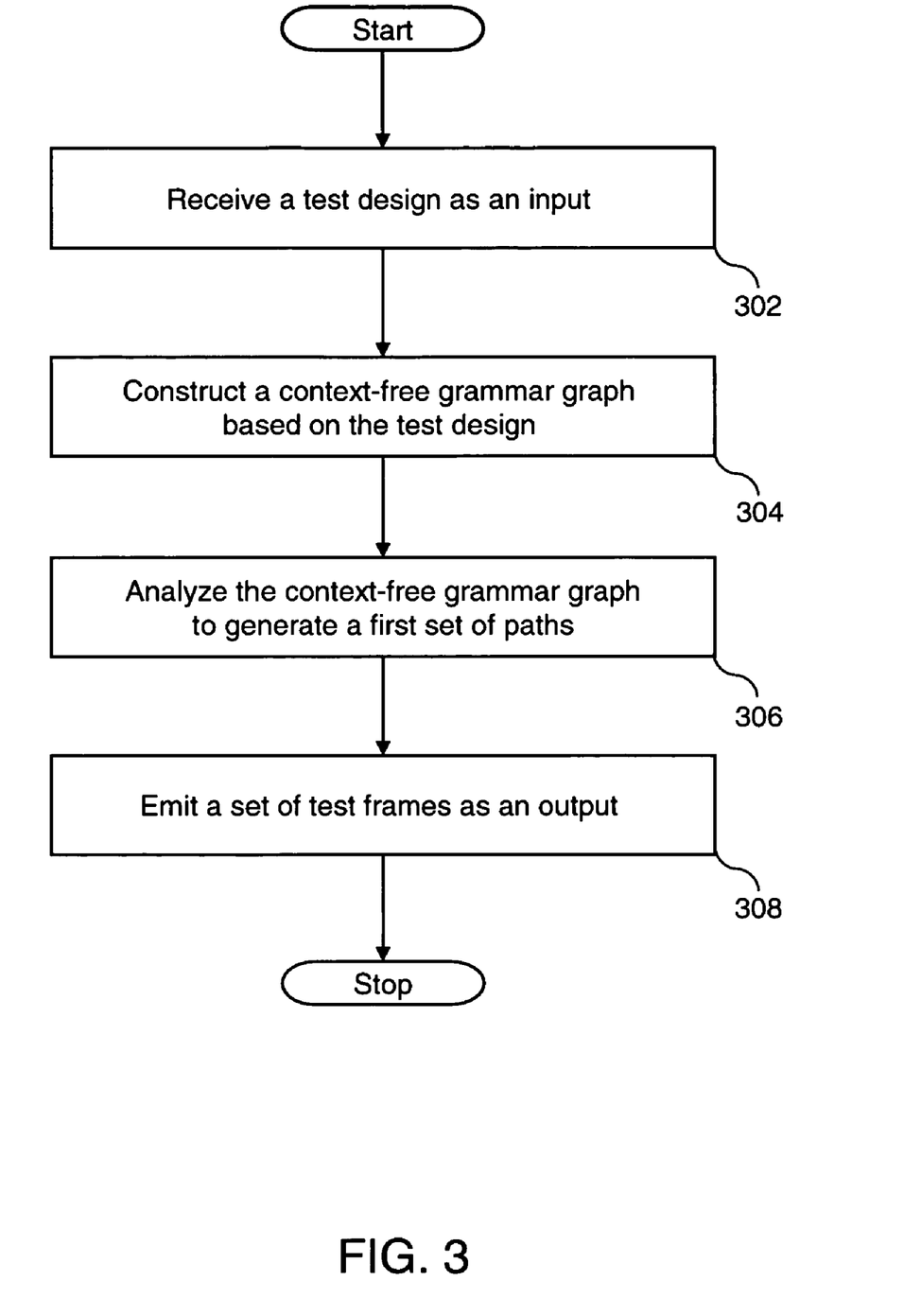
FIG. 3 is a flow diagram illustrating a method for generating test frames in specification-based testing using path coverage criterion, in accordance with an embodiment of the present invention.

FIG. 3 is a flow diagram illustrating a method for generating test frames in specification-based testing by using a path-coverage criterion, in accordance with an embodiment of the present invention. In the method, the path-coverage criterion ensures that every possible test scenario for the test design is covered. This is achieved by generating all possible test frames for the test design and evaluating these test frames for a frame constraint. To describe the method, reference will be made to FIG. 1, although it is understood that the method can be implemented with reference to any other suitable embodiment of the present invention. Further, the method can contain a greater or fewer numbers of steps than shown in FIG. 3.

At step 302, a test design is received as an input by the test generator 100. The test design is received by the receiver module 102 of the test generator 100. The test design is represented as an ECFG model and can be expressed in TSL. At step 304, a context-free grammar graph is constructed by the ECFG module 104. The context-free grammar graph is based on the test design. The context-free grammar graph includes a plurality of paths, which represent all the test scenarios possible in the test design. At step 306, the context-free grammar graph is analyzed by the test generator 100. The analyzer module 106 of the test generator 100 analyzes the context-free grammar graph to generate a first set of paths. The first set of paths represents a collection of paths from the plurality of paths that satisfy pre-conditions associated with choices pertaining to the plurality of paths. Typically, unwanted paths from the plurality of paths are filtered out by the analyzer module 106. Examples of unwanted paths include paths with invalid branching and/or invalid choices, and the like. At step 308, a set of test frames is emitted by the output module 108. The set of test frames represents a second set of paths from the first set of paths that satisfy a frame constraint associated with the test design. Typically, the frame constraint is specified in the test design. The set of test frames is the output of the test generator 100.

FIGS. 4, 5, 6 and 7 illustrate a detailed flow diagram of a method for generating test frames in specification-based testing, in accordance with an embodiment of the present invention. To describe the method, reference will be made to FIG. 1, although it is understood that the method can be implemented with reference to any other suitable embodiment of the present invention. Further, the method can contain a greater or fewer numbers of steps than shown in FIGS. 4, 5, 6 and 7.

Figure 4:
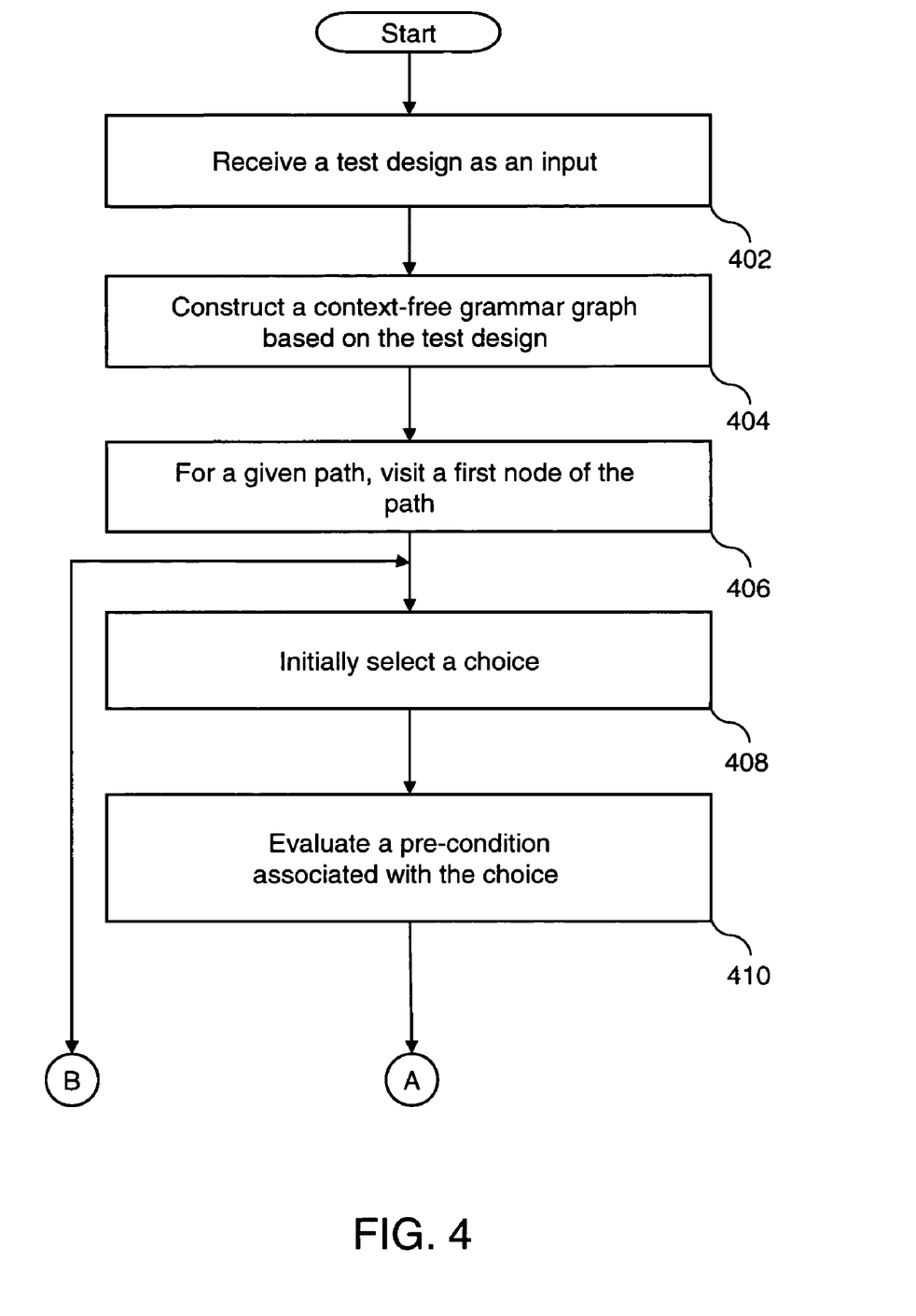
FIGS. 4, 5, 6 and 7 is a detailed flow diagram illustrating a method for generating test frames in specification-based testing, in accordance with an embodiment of the present invention.

At step 402, a test design is received as an input by the receiver module 102 of the test generator 100. The test design is represented as an ECFG and can be represented in TSL. Typically, a frame constraint is specified with the test design. At step 404, a context-free grammar graph is constructed by the ECFG module 104. The context-free grammar is based on the test design. The context-free grammar graph includes a plurality of paths that capture possible test scenarios for the test design. Typically, individual internal nodes of the context-free grammar graph are associated with non-terminals of the ECFG while individual leaf nodes of the context-free grammar graph are associated with terminals of the ECFG. Each path from the plurality of paths represents a test scenario in the test design. A choice of the context-free grammar graph can imply an alternative production of a non-terminal in the ECFG. A pre-condition can be associated with a choice. Typically, a precondition is a Boolean expression that is made up of the variables introduced in the test design and/or Boolean expressions specifying the selection status of the choices associated with non-terminals. In an embodiment of the present invention, the Boolean expression is set during test generation. For a path from the plurality of paths, at step 406, a first node of the path is visited by the examining module 110. In an embodiment of the present invention, the first node is a root node of the context-free grammar graph. At step 408, the selector module 112 initially selects a choice out of the first node. The choice associated with the first node is selected initially, provided the first node is a non-terminal. At step 410, a pre-condition associated with the choice is evaluated.

Figure 5:
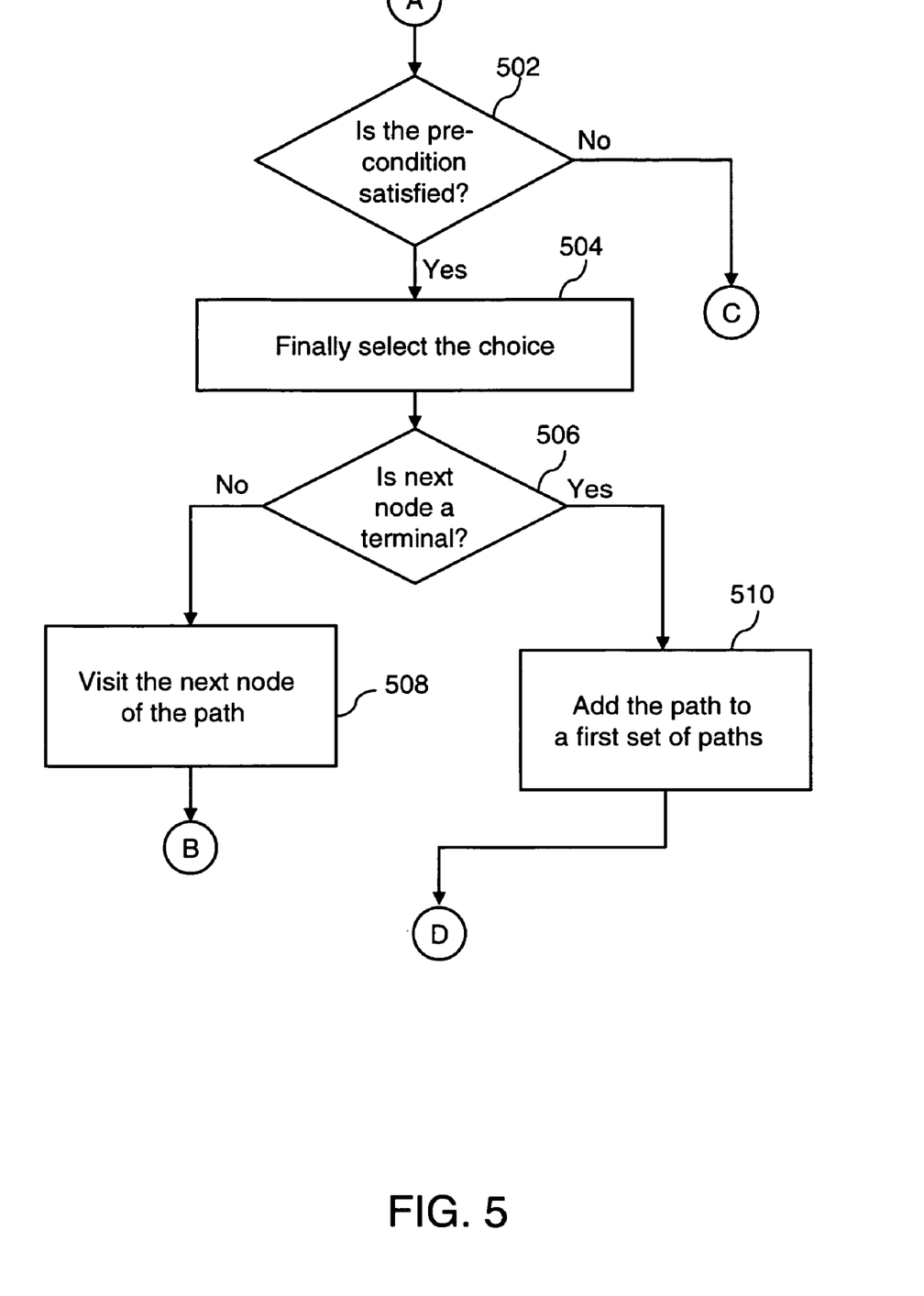

At step 502, the pre-condition evaluation module 114 determines whether the pre-condition associated with the choice is satisfied. After this, the detector 124 detects cycles in the context-free grammar graph. These cycles are detected by the detector 124 by maintaining a list of nodes that have been visited. Detecting cycles also includes repeatedly expanding the cycles in a generic path, one or more times, to obtain specific cycle-free paths. In an embodiment of the present invention, the detector 124 detects cycles, while the examining module 110 traverses the context-free grammar graph. Typically, if a choice leading to a cycle is guarded or associated with a pre-condition, the cycle is expanded as long as the pre-condition remains true. If a choice leading to a cycle is unguarded or is not associated with a pre-condition, then the cycle is expanded a random number of times, limited by a user-specified depth factor. When the pre-condition is satisfied, at step 504, the selector module 112 finally selects the choice out of the first node. At step 506, the examining module 110 determines whether a next node of the context-free grammar graph is a terminal. Typically, the next node is a child node of the first node. At step 508, the next node is visited by the examining module 110 by visiting a choice out of the next node. In an embodiment of the present invention, the next node is visited, based on a depth-first traversal of the context-free grammar graph. Typically, the steps 406 till 508 are iteratively repeated, as shown in FIGS. 4 and 5 by the examining module 110, till the next node visited is a terminal. When the next node visited is a terminal, it signifies that the end of the path has been reached. At step 510, the path is added to a first set of paths by the adder module 116, when the next node is a terminal. For the path, pre-conditions associated with all the choices that are associated with the path are satisfied. Steps 406 till 510 are repeated for each of the plurality of paths, to select the first set of paths. The first set of paths represents a collection of paths from the plurality of paths that satisfy all preconditions associated with the choices associated with the collection of paths.

Figure 6:
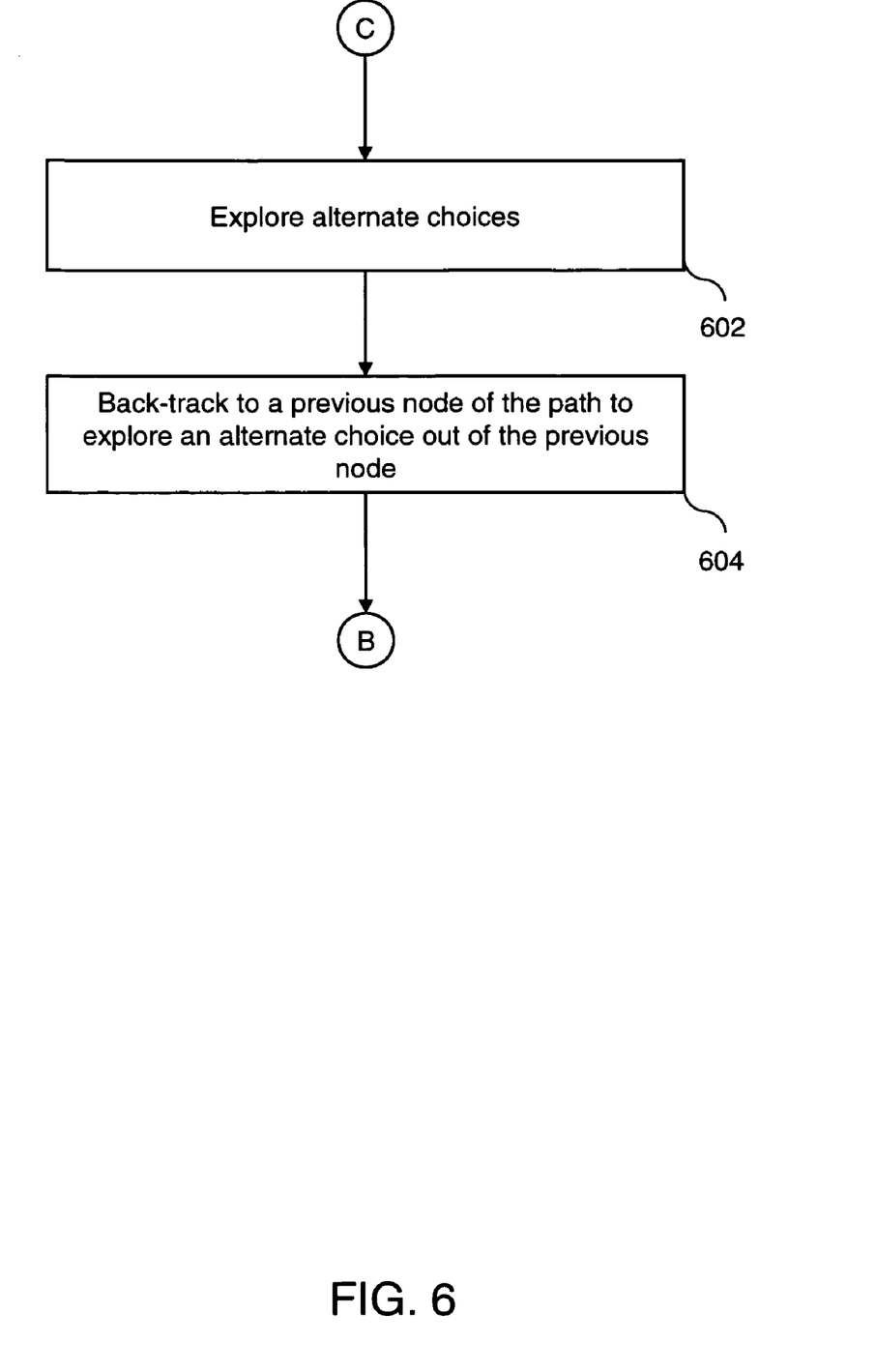

At step 602, alternative choices out of the first node are explored by the back-tracking module 122, when the pre-condition associated with the choice out of the first node is not satisfied at step 502. In an embodiment of the present invention, the step 602 is followed by the steps 406 till 502, for the alternative choices of the first node. At step 604, the back-tracking module 122 back-tracks to a previous node to explore an alternative choice out of the previous node, when the pre-conditions associated with the alternative choices associated with the first node are not satisfied. The previous node is an ancestor node of the first node. In an embodiment of the present invention, the ancestor node is the root node of the context-free grammar graph. Typically, steps 406 till 502 are iteratively repeated for the alternative choice out of the previous node. In another embodiment of the present invention, the previous node and the alternative choice out of the previous node are part of an alternative path from the plurality of paths. The alternative path can be considered as a test frame.

Figure 7:
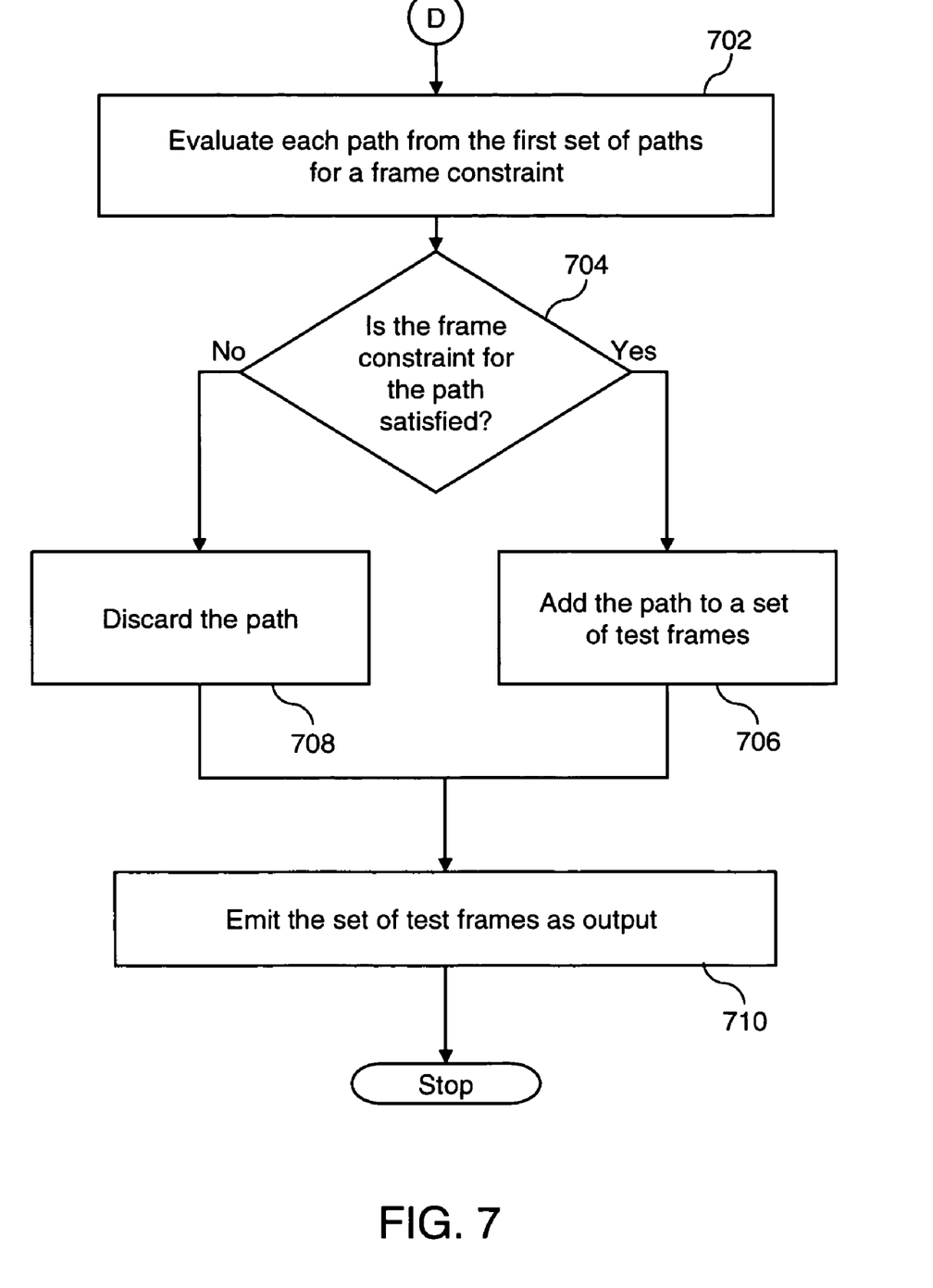

At step 702, a path from the first set of paths is evaluated by the frame-constraint evaluation module 118 for the frame constraint associated with the test design. At step 704, the frame-constraint evaluation module 118 determines whether the frame constraint for the path from the first set of paths is satisfied. At step 706, the path is added to a set of test frames, when the frame constraint for path is satisfied. The steps 702 till 706 are repeated for all the paths from the first set of paths. The set of test frames represents a second set of paths obtained from the first set of paths for which the frame constraint is satisfied. At step 708, the path is discarded by the discarder module 120 when the frame constraint for the path is not satisfied. Typically, the steps 702 till 708 are repeated for all the paths from the first set of paths. At step 710, the set of test frames is emitted as an output of the test generator 100 by the output module 108.

Although FIGS. 1, 5, 6 and 7 show the generation of the first set of paths and the evaluation of pre-conditions as separate activities, it will be apparent to a person skilled in the art that, in practice, for optimization purposes, both the activities may be merged into one. In other words, as a path is being generated in a depth-first manner, the test generator 100 evaluates the pre-conditions as they are encountered. If a pre-condition is not satisfied, back-tracking takes place.

Figure 8:
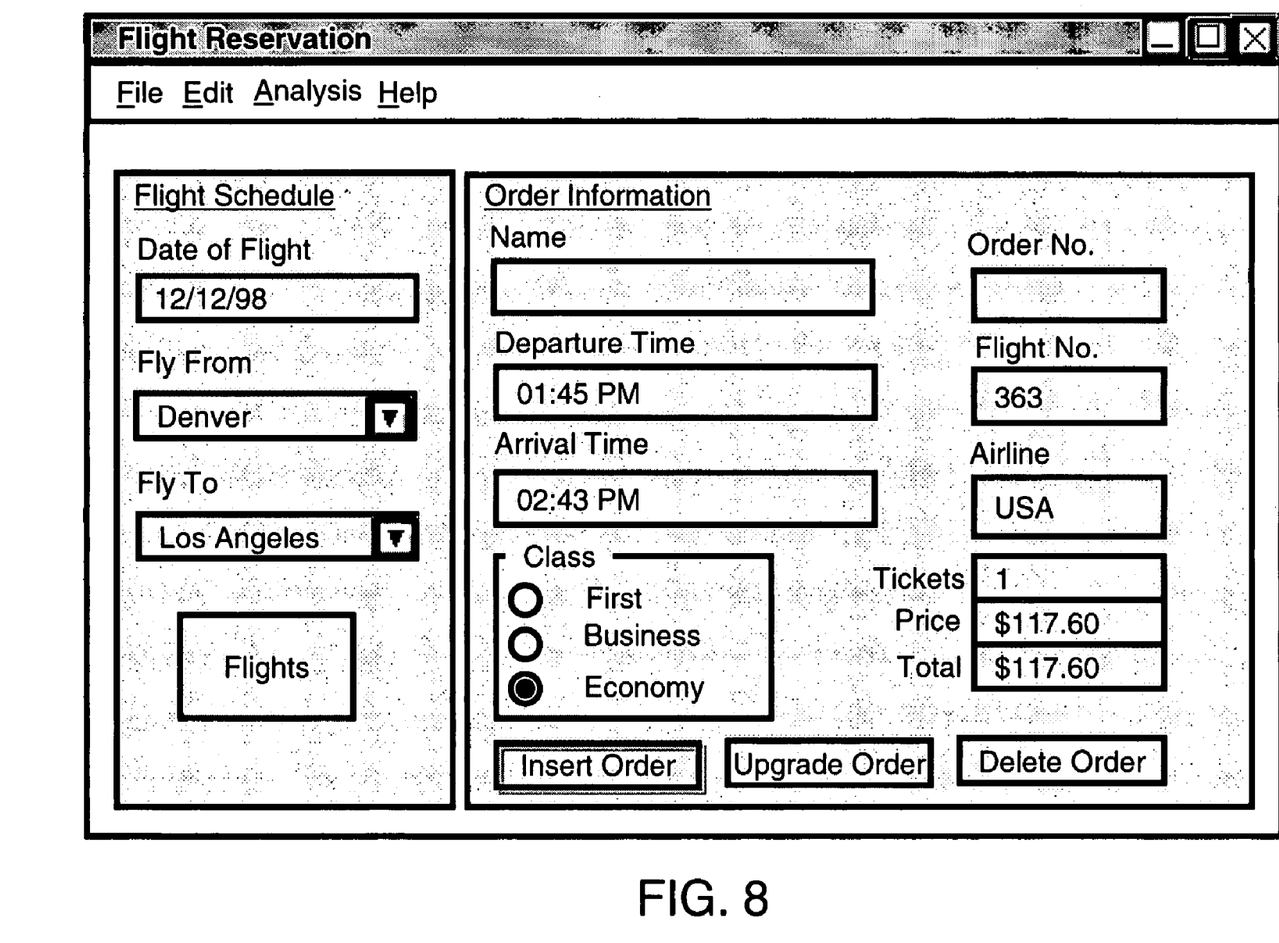
FIG. 8 is an interface illustrating an example of an application to generate test frames for Flight Reservation software, in accordance with an embodiment of the present invention.

FIG. 8 is an interface illustrating an application, to generate test frames for Flight Reservation software, in accordance with an embodiment of the present invention. This Flight Reservation software is a Graphical User Interface (GUI) that allows agents to book new orders for tickets, modify old orders, and fax orders. A test design of the Flight Reservation software is viewed in the form of the ECFG by a test generator. For illustrative purposes, only the booking of a 'New Order' is described. An ECFG for the Flight Reservation software is provided below:

File-->new NewOrder
NewOrder-->Enter_flight_Date ValidateDate
Enter_flight_Date-->valid|invalid
ValidateDate-->NewOrder; pre-condition (Date~invalid)
ValidateDate-->SelectFlyFromCity; pre-condition (Date~valid)
SelectFlyFromCity-->Select_fly_from_city_from_list-box SelectFlyToCity
SelectFlyToCity-->Select_fly to_city_from_list-box FlightSelection.
FlightSelection-->Select_Flight ConfirmFlight
ConfirmFlight-->Cancel FlightSelection
ConfirmFlight-->OK AcceptNoOfTickets_Name
AcceptNoOfTickets_Name-->ChangeRoute NewOrder
AcceptNoOfTickets_Name-->noRouteChange:enter_Data ValidateData
Data-->valid|invalid
ValidateData-->AcceptNoOfTickets_Name; pre-condition (Data~invalid)
ValidateData-->InsertOrder ValidInsertion; pre-condition (Data~valid)

The NewOrder option can be invoked from the File menu. A user can enter the date of flight in the Date of Flight edit box. The user can also select 'Fly from' and 'Fly to' cities from the list boxes provided. When the user clicks the 'OK' button, the 'Name' and 'Tickets' edit boxes are enabled. When the entries are valid, the 'Insert Order' button is enabled. Each path for the test design begins by expanding 'File-->new NewOrder' and can end with 'ValidateData-->InsertOrder ValidInsertion'.

The test generator first constructs a context-free grammar graph, based on the ECFG. Typically, the test generator annotates the choices of the context-free grammar graph with pre-conditions from a TSL program. The context-free grammar graph includes a plurality of paths. After this, each path from the plurality of paths of the context-free grammar graph is traversed by the test generator. While traversing the path, the test generator visits every node of the path, starting from the root node of the context-free grammar graph, for example, 'File', which is the start non-terminal of the ECFG to a leaf node of the context-free grammar graph. In an embodiment of the present invention, a record of choices, selected for non-terminals visited as well as an interpretation of actions performed, including the state of variables mentioned in the test design, if there are any, are maintained in a data structure. Typically, cycles in the context-free grammar graph are detected by maintaining a list of nodes that have been already visited. Consequently, a path thus constructed can include nested cycles. After traversing the context-free grammar graph, the test generator emits a set of paths from the plurality of paths, which satisfy pre-conditions encountered along the choices in a path.

For illustrative purposes, some of the paths from the set of paths of the ECFG are described below. Curly braces indicate cycles while user input such as 'Data' is shown within parenthesis and prefixed by '#'.

Path 1: File #(New)-->NewOrder #(Enter Date)-->ValidateDate-->SelectFlyFromCity #(select from list-box 'Fly from city')-->SelectFlyToCity #(select from list-box 'Fly to city')-->FlightSelection #(select 'Flight' From the interface)-->ConfirmFlight-->#(OK) AcceptNoOfTickets_Name #(enter Data: Name and Number of Tickets)-->ValidateData-->#(Insert) ValidInsertion.

For test cases that are instances of Path 1, which is a test frame, a valid date of flight is entered, 'fly from' and 'fly to' cities are selected, a 'flight' from the interface is selected, the valid number of tickets and names are entered, and a valid order is inserted.

Path 2: File #(New)-->NewOrder #(Enter Date)-->ValidateDate-->SelectFlyFromCity #(select from list-box 'Fly from city')-->SelectFlyToCity #(select from list-box 'Fly to city')-->{FlightSelection #(select 'Flight' From the interface)-->ConfirmFlight #(Cancel)-->FlightSelection #(select 'Flight' from the interface)}-->ConfirmFlight-->#(OK) AcceptNoOfTickets_Name #(enter Data: Name and number of Tickets)-->ValidateData-->#(Insert) ValidInsertion.

Test cases that are instances of Path 2 are similar to those of Path 1. The only difference is that, in the case of Path 2, the selected flight from the interface is not confirmed at least once and is selected again. Typically, the above-mentioned cycle is repeated before the flight selection is confirmed.

Path 3: File #(New)-->NewOrder #(Enter Date)-->{ValidateDate-->NewOrder-->(re-enter a valid date)-->ValidateDate}-->SelectFlyFromCity #(select from list-box 'Fly from city')-->SelectFlyToCity #(select from list-box 'Fly to city')-->FlightSelection #(select 'Flight' from the interface)-->ConfirmFlight-->#(OK) AcceptNoOfTickets_Name #(enter Data: Name and number of Tickets)-->ValidateData-->#(Insert) ValidInsertion.

Test cases that are instances of Path 3 are similar to those of Path 1. The only difference they have is that in case of Path 3, the date of flight entered is invalid at least once the Flight Reservation software transitions from a state that validates the date to a previous state 'NewOrder' so that the date of flight is entered again. Typically, above cycle is repeated for multiple times till a valid date is entered.

Path 4: File #(New)-->{NewOrder #(Enter Date)-->ValidateDate-->SelectFlyFromCity #(select from list-box 'Fly from city')-->SelectFlyToCity #(select from list-box 'Fly to city')-->FlightSelection #(select Flight from the interface)-->ConfirmFlight-->#(OK) AcceptNoOfTickets_Name #(ChangeRoute)} #(noRouteChange: enter Data: Nmae and Number of tickets)-->ValidateData-->#(Insert)-->ValidInsertion.

Test cases, that are instances of Path 4, enter a valid date of flight, select 'fly from' and 'fly to' cities and a 'flight' from the interface, and then the user changes flight information by returning to the state 'NewOrder' from the state 'AcceptNoOfTickets_Name'. Typically, the above-mentioned cycle is repeated multiple times.

As described above, the present invention provides a method for generating test frames that accepts an extended context-free grammar-based test design as an input, to generate all the possible paths. The test generation provides a path coverage criterion in specification-based testing, ensuring that every possible test scenario for the test design has been covered. This is achieved by generating all the possible test frames for the test design, and evaluating these test frames for a frame constraint. In the present invention, paths that are once generated need not be generated again. Consequently, the present invention advantageously reduces frequent backtracking with overheads of repeated random number generation, while systematically carrying out a depth-first traversal of the context-free grammar graph of the test design. The present invention enhances the current TSL technology by introducing the path-coverage criterion for a test design in TSL-based specification-based testing. This feature acts as a measure of test adequacy in black-box testing. The test developer is sure of generating all the test scenarios by generating only one instance of each path, using path-coverage criterion in a TSL test design.

The method for generating test frames in specification-based testing, as described in the present invention, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine. Exemplary storage elements include hard disk, DRAM, SRAM and EPROM. The storage element may also be external to the computer system, and connected to or inserted into the computer for download at or prior to the time of use. Exemplary of such external computer program products are computer readable storage mediums such as CD-ROMS, Flash chips, floppy disks, and the like.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The software program containing the set of instructions can be embedded in a computer program product for use with a computer, the computer program product comprising a computer usable medium having a computer readable program code embodied therein. The processing of input data by the processing machine may be in response to user commands, or in response to results of previous processing or in response to a request made by another processing machine.

The modules described herein may include processors and program instructions to implement the functions of the modules described herein. Some or all functions could be implemented by a state machine that has no stored program instructions, or in one or more application specific integrated circuits (ASICs), in which each function or some combinations of certain of the functions are implemented as custom logic.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention, as described in the claims.

What is claimed is:

1. A method of generating test frames in specification-based testing, the method comprising the steps of:
    receiving a test design as an input, wherein the test design is represented as an extended context-free grammar (ECFG);
    constructing a context-free grammar graph based on the test design, wherein the context-free grammar graph comprises a plurality of paths;
    analyzing the context-free grammar graph to generate a first set of paths from the plurality of paths that satisfy one or more pre-conditions by examining each valid path from the plurality of paths, starting from a root node of the context-free grammar graph to a leaf node of the context-free grammar graph, wherein examining each valid path comprises the steps of:
    visiting a first node of the path;
    initially selecting a choice out of the first node based on depth-first traversal, wherein the-first node is a non-terminal;
    evaluating a pre-condition of the one or more pre-conditions associated with the choice and finally selecting the choice when the pre-condition associated with the choice is satisfied;
    visiting a next node of the path by visiting the choice out of the first node which satisfies the pre-condition;
    detecting cycles in the context-free grammar graph by maintaining a list of visited nodes; and
    iteratively repeating the steps of initially selecting the choice, finally selecting the choice, visiting the next node, and detecting cycles for each node of the path until the next node is a terminal;
    repeatedly expanding the cycles in the paths of the first set of paths, wherein repeatedly expanding the cycles comprises, for each of the cycles, determining if the cycle is guarded by a pre-condition of the one or more pre-conditions, expanding the cycle as long as the guarding pre-condition remains true when the cycle is guarded, and expanding the cycle a random number of times when the cycle is not guarded; and
    emitting a set of test frames as an output, wherein the set of test frames is a second set of paths obtained from the first set of paths that satisfy a frame constraint specified in the test design.

2. The method of generating test frames as claimed in claim 1, wherein individual internal nodes of the context-free grammar graph are associated with non-terminals and individual leaf nodes of the context-free grammar graph are associated with terminals.

3. The method of generating test frames as claimed in claim 1, wherein the association between the choice and the pre-condition of the one or more preconditions is specified in the ECFG.

4. The method of generating test frames as claimed in claim 1, wherein the first set of paths includes each examined valid path of the plurality of paths, wherein a path of the plurality of paths is a valid path when the pre-condition associated with the choice is satisfied for each node of the path.

5. The method of generating test frames as claimed in claim 4, further comprising the steps of:
    evaluating a path from the first set of paths for the frame constraint; and
    adding the evaluated path to the second set of paths when the frame constraint is satisfied for the evaluated path.

6. The method of generating test frames as claimed in claim 5, further comprising the step of:
    discarding the evaluated path when the frame constraint is not satisfied for the evaluated path.

7. The method of generating test frames as claimed in claim 1 further comprising the step of:
    exploring alternative choices out of the first node when the precondition associated with the choice is not satisfied; and
    back-tracking to a previous node of the path to explore an alternative choice out of the previous node, when preconditions associated with the alternative choices out of the first node are not satisfied, wherein the previous node is an ancestor node of the first node.

8. The method of generating test frames as claimed in claim 7, wherein the previous node and the alternative choice out of the previous node are a part of an alternative path from the plurality of paths, wherein the alternative path is considered as part of the test frame.

9. The method of generating test frames as claimed in claim 7, wherein the ancestor node is the root node of the context-free grammar graph.

10. A method of generating test frames in specification-based testing based on extended context-free grammar (ECFG) models described in Test Specification Language using path coverage criterion, the method comprising the steps of:
    constructing a context-free grammar graph based on a test design written in the Test Specification Language (TSL), wherein the context-free grammar graph comprises a plurality of paths, further wherein internal nodes of the context-free grammar graph represent non-terminals with choices joining non-terminals, further wherein the ECFG may associate one or more pre-conditions with one or more of the choices;
    analyzing the plurality of paths of the context-flee grammar graph by examining each valid path from the plurality of paths starting from a root node of the context-free grammar graph to a leaf node of the context-free grammar graph to generate a first set of paths, wherein the first set of paths includes each examined valid path, wherein each valid path is a path from the plurality of paths whose pre-conditions that are associated with the choices of the nodes in the path are all satisfied, wherein examining each valid path comprises:
    visiting a first node of the path;
    initially selecting a choice out of the first node based on depth-first traversal, wherein the first node is a non-terminal;
    evaluating a pre-condition of the one or more preconditions associated with the choice and finally selecting the choice when the pre-condition associated with the choice is satisfied;
    visiting a next node of the path by visiting the choice out of the first node, which satisfies the pre-condition;
    detecting cycles in the context-flee grammar graph by maintaining a list of visited nodes; and
    iteratively repeating the steps of initially selecting the choice, finally selecting the choice, visiting the next node, and detecting cycles for each node of the path until the next node is a terminal;

repeatedly expanding the cycles in the paths of the first set of paths, wherein repeatedly expanding the cycles comprises, for each of the cycles, determining if the cycle is guarded by a pre-condition of the one or more pre-conditions, expanding the cycle as long as the guarding pre-condition remains true when the cycle is guarded, and expanding the cycle a random number of times when the cycle is not guarded; and emitting a set of test frames, wherein the set of test frames is a second set of paths from the first set of paths that satisfy a frame constraint specified in the test design.

11. The method of generating test frames as claimed in claim 10, further comprising the steps of:
evaluating a path from the first set of paths for the frame constraint; and
adding the evaluated path to the second set of paths when the frame constraint is satisfied for the evaluated path.

12. The method of generating test frames as claimed in claim 11, further comprising the step of:
discarding the evaluated path when the frame constraint is not satisfied for the evaluated path.

13. The method of generating test frames as claimed in claim 10 further comprising the step of:
exploring alternative choices out of the first node when the pre-condition associated with the choice is not satisfied; and
back-tracking to a previous node of the path to explore an alternative choice out of the previous node, when pre-conditions associated to the alternative choices are not satisfied, wherein the previous node is an ancestor node of the first node.

14. The method of generating the test frames as claimed in claim 13, wherein the previous node and the alternative choice out of the previous node are a part of a next path from the plurality of paths.

15. The method of generating test frames as claimed in claim 13, wherein the ancestor node is the root node of the context-free grammar graph.

16. A computer program product for generating test frames in specification-based testing, the computer program product comprising a non-transitory computer readable medium comprising:
program instruction means for receiving a test design as an input, wherein the test design is represented as an extended context-free grammar (ECFG);
program instruction means for constructing a context-free grammar graph based on the test design, wherein the context-free grammar graph comprises a plurality of paths;
program instruction means for analyzing the plurality of paths of the context-free grammar graph to generate a first set of paths by performing a depth-first traversal of nodes of the context free grammar graph, from a root node of the context-free grammar graph to a leaf node of the context-free grammar graph, to construct one or more valid paths from the plurality of paths, wherein one or more pre-conditions associated with choices that are associated with the nodes of the one or more valid paths are all satisfied;
program instruction means for detecting cycles in the context-free grammar graph by maintaining a list of nodes visited during the depth-first traversal;
program instruction means for repeatedly expanding the cycles in the paths of the first set of paths, wherein repeatedly expanding the cycles comprises, for each of the cycles, determining if the cycle is guarded by a pre-condition of the one or more pre-conditions, expanding the cycle as long as the guarding pre-condition remains true when the cycle is guarded, and expanding the cycle a random number of times when the cycle is not guarded; and program instruction means for emitting a set of test frames as an output, wherein the set of test frames is a second set of paths from the first set of paths that satisfy a frame constraint associated with the test design.

17. The computer program product for generating test frames as claimed in claim 16, wherein program instruction means for analyzing each path from the plurality of paths to construct one or more valid paths further comprises:
program instruction means for visiting the nodes of each path;
program instruction means for selecting a choice out of a visited node of the path, wherein the visited node is a non-terminal; and
program instruction means for evaluating a pre-condition of the one or more pre-conditions associated with the selected choice; and
wherein program instruction means for emitting a set of test frames further comprises program instruction means for evaluating each path from the first set of paths for the frame constraint associated with the test design.

18. The computer program product for generating test frames as claimed in claim 17 further comprising:
program instruction means for discarding the evaluated path; and
program instruction means for back-tracking to another node of the path for exploring an alternative choice out of the another node, wherein the another node is an ancestor node of the visited node.

19. A test generator for generating test frames based on specification-based testing, the test generator comprising:
a memory operable to store a test design, wherein the test design is represented as an extended context-free grammar (ECFG); and
a processor operatively coupled to the memory, wherein the processor is operable to:
construct a context-free grammar graph based on the test design, wherein the context-free grammar graph comprises a plurality of paths;
analyze the context-free grammar graph to generate a first set of paths from the plurality of paths that satisfy one or more pre-conditions by examining each valid path from the plurality of paths, starting from a root node of the context-free grammar graph to a leaf node of the context-free grammar graph, wherein examining each valid path comprises the steps of:
visiting a first node of the path;
initially selecting a choice out of the first node based on depth-first traversal, wherein the-first node is a non-terminal;
evaluating a pre-condition of the one or more pre-conditions associated with the choice and finally selecting the choice when the pre-condition associated with the choice is satisfied;
visiting a next node of the path by visiting the choice out of the first node which satisfies the pre-condition;
detecting cycles in the context-free grammar graph by maintaining a list of visited nodes; and
iteratively repeating the steps of initially selecting the choice, finally selecting the choice, visiting the next node, and detecting cycles for each node of the path until the next node is a terminal;

repeatedly expanding the cycles in the paths of the first set of paths, wherein repeatedly expanding the cycles comprises, for each of the cycles, determining if the cycle is guarded by a pre-condition of the one or more pre-conditions, expanding the cycle as long as the guarding pre-condition remains true when the cycle is guarded, and expanding the cycle a random number of times when the cycle is not guarded; and emit a set of test frames as an output, wherein the set of test frames is a second set of paths obtained from the first set of paths that satisfy a frame constraint specified in the test design.

20. The test generator as claimed in claim 19, further comprising:

an input interface operatively coupled to the memory and the processor, wherein the input interface provides the test design as an input for the test generator.

\* \* \* \* \*